United States Patent
Baskin et al.

(10) Patent No.: US 11,709,113 B2
(45) Date of Patent: Jul. 25, 2023

(54) ELASTOMERIC BEARING MONITORING SYSTEM

(71) Applicant: Bell Textron Inc., Fort Worth, TX (US)

(72) Inventors: Bryan K. Baskin, Arlington, TX (US); Brian E. Tucker, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 202 days.

(21) Appl. No.: 17/370,783

(22) Filed: Jul. 8, 2021

(65) Prior Publication Data
US 2023/0009950 A1 Jan. 12, 2023

(51) Int. Cl.
| | |
|---|---|
| *B64F 5/60* | (2017.01) |
| *G01M 13/04* | (2019.01) |
| *B64C 27/35* | (2006.01) |
| *G01J 5/00* | (2022.01) |
| *H04N 5/33* | (2023.01) |
| *G01K 13/04* | (2006.01) |

(52) U.S. Cl.
CPC ............ *G01M 13/04* (2013.01); *B64C 27/35* (2013.01); *B64F 5/60* (2017.01); *G01J 5/0022* (2013.01); *G01K 13/04* (2013.01); *H04N 5/33* (2013.01); *G01J 2005/0077* (2013.01)

(58) Field of Classification Search
CPC .......... B64C 27/35; B64F 5/60; G01J 5/0022; G01J 2005/0077; G01K 13/04; G01M 13/04; H04N 5/33
See application file for complete search history.

(56) References Cited

U.S. PATENT DOCUMENTS

| | | | |
|---|---|---|---|
| 2003/0012467 A1* | 1/2003 | Merot | F16C 27/063 384/220 |
| 2008/0063251 A1* | 3/2008 | Deutsch | G06V 20/693 382/133 |
| 2010/0163239 A1* | 7/2010 | Angel | E21B 37/00 166/170 |
| 2019/0279442 A1* | 9/2019 | Jasper | B64D 35/00 |
| 2020/0118367 A1* | 4/2020 | Dudar | F02D 41/22 |
| 2021/0157998 A1* | 5/2021 | Rodriguez | G07G 1/0054 |
| 2021/0215474 A1* | 7/2021 | Adelson | G01B 1/00 |
| 2022/0063797 A1* | 3/2022 | Baskin | B64C 13/50 |
| 2022/0155506 A1* | 5/2022 | Kolle | G02B 26/001 |

OTHER PUBLICATIONS

Scetta, Giorgia. Fatigue Cracking of Thermoplastic Elastomers. Universite Paris sciences et lettres, 2020. NNT: 2020UPSLS022. tel-03149063, [retrieved on Feb. 1, 2022]. Retrieved from the Internet <https://www.researchgate.net/publication/349552745_Fatigue_cracking_of_thermoplastic_elastomers>.
Correlated Solutions Europe. Principle of Digital Image Correlation. DIC Forums. [retrieved on Feb. 1, 2022]. Retrieved from the Internet <https://correlatedsolutions.eu/category/products/dic-systems/principle-of-digital-image-correlation/>.

* cited by examiner

*Primary Examiner* — Eric S. McCall
(74) *Attorney, Agent, or Firm* — Frost Brown Todd LLP (57) ABSTRACT

A system for monitoring of elastomeric bearings is described. A pattern or shape can be applied to a joint comprising elastomeric material. A camera can be disposed such that it can capture photographs or video of the pattern and how it deforms under torque and other stresses. Actual deformation of the shape/pattern can be compared to an expected deformation to gauge levels of degradation of the elastomeric material or other joint components.

20 Claims, 6 Drawing Sheets

ELASTOMERIC BEARING MONITORING SYSTEM

TECHNICAL FIELD

The present disclosure is directed to elastomeric bearing monitoring systems.

BACKGROUND OF THE INVENTION

At some joints within machinery or vehicles elastomeric bearings are used. Elastomers are generally rubber-type compounds. Once installed, elastomeric bearings may be hidden from view within casings or other components. Like any material, elastomers can fail over time. To predict or prevent failure, elastomeric bearings must be manually revealed and observed. This may entail taking apart machinery so that strains, cracking, crumbling, and other signs of failure can be seen, measured, or analyzed.

BRIEF SUMMARY OF THE INVENTION

One embodiment under the present disclosure is a system for monitoring degradation of elastomeric bearings in a joint, comprising: a joint comprising two or more layers of elastomeric material disposed between three or more metallic elements and configured to accommodate motion in the joint; a pattern disposed across a surface of the joint, the surface comprising the two or more layers of elastomeric material and the three or more metallic elements, the pattern configured to be deformed during use of the joint; one or more digital cameras configured to view the pattern and record one or more images of the pattern and the surface of the joint; and a computing device communicatively coupled to the one or more digital cameras and configured to analyze the one or more images and to determine if they indicate unacceptable degradation of the two or more layers of elastomeric material, the computing device further configured to, if unacceptable degradation is determined, provide a notification of the unacceptable degradation.

Another possible embodiment is a monitoring system for elastomeric bearings, comprising: two or more layers of elastomeric material disposed around a joint; one or more metal shims between the two or more layers of elastomeric material; a pattern applied to the two or more layers of elastomeric material, the pattern configured to be predictably deformable when the joint is in use; one or more cameras operable to capture a plurality of images of the pattern; a computing device communicatively coupled to the one or more cameras and operable to analyze the plurality of images and determine the level of degradation of the two or more layers of elastomeric material and to transmit a notification when the level of degradation is too high.

Another possible embodiment is a method of monitoring elastomeric bearings, comprising: applying a pattern to a surface of a joint, the surface comprising portions of two or more layers of elastomeric material and one or more shims disposed between the two or more layers of elastomeric material, wherein the pattern is configured to be predictably deformable for an expected use of the joint; capturing, by one or more cameras, a plurality of images of the pattern and the surface; communicating, by the one or more cameras, the plurality of images to a computing device; determining, by the computing device, a level of deterioration of the two or more layers of elastomeric material based on the plurality of images; and if the level of deterioration is too high, then sending, by the computing device, a notification of the level of deterioration.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Elastomeric bearings are used in some machinery and vehicles. Such bearings have advantages, such as being resistant to things like sand. They can be useful where there is not a lot of motion, and users want a low maintenance solution. But no solution is zero maintenance. Elastomers, which are generally rubber-like, do fail eventually. To observe wear and tear, and judge how close to failure an elastomeric bearing is, one must either use a borescope or open a joint to inspect the bearing in some cases. Such methods can be imprecise, or costly in terms of time. Sometimes opening a joint can lead to mechanical failures, in the joint, bearing, or elsewhere in a machine or components.

Figure 1:
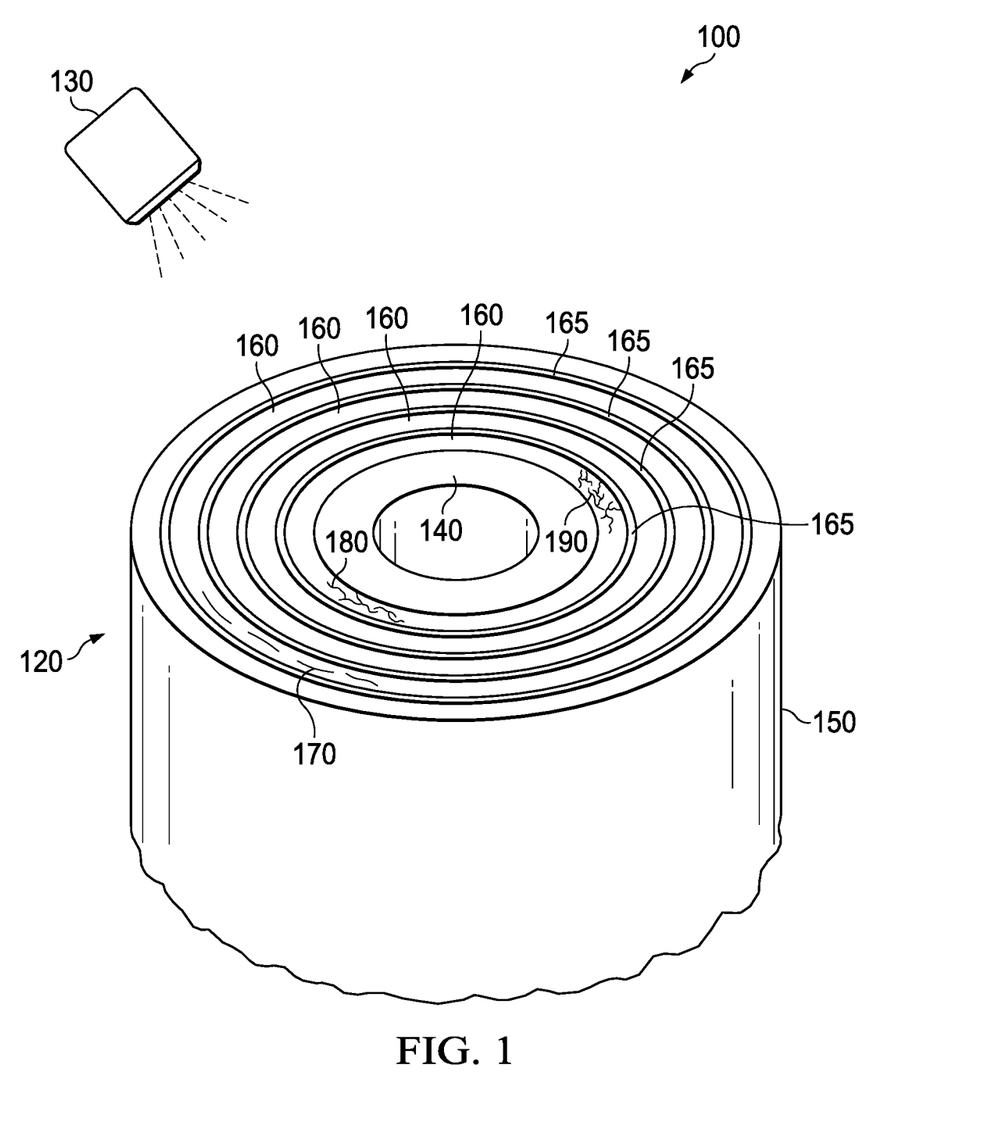
FIG. 1 is a diagram of a bearing monitoring system under the present disclosure.

Referring now to FIG. 1, an embodiment of an elastomeric bearing monitoring system 100 under the present disclosure can be seen. Camera 130 is located such that it can observe joint 120. Metal interior 140 is surrounded by elastomeric bearing 160, comprising (in this embodiment) four concentric circles of elastomeric materials. Shims 165 are layered between layers of elastomeric bearing 160. Metal exterior 150 surrounds elastomeric bearing 160. Other joint embodiments are contemplated with varying geometries and sizes while keeping with the teachings of the present disclosure. Different types of failure can occur in elastomeric bearing 160 over time, such as cracking 180, crumbling 190, and tears 170. In the prior art, it was necessary to take apart joint 120 and observe wear and tear manually. Under the present disclosure, camera 130 can observe wear and tear without costly, time consuming, and possibly deleterious manual work in inspection of joints.

Figure 2A:
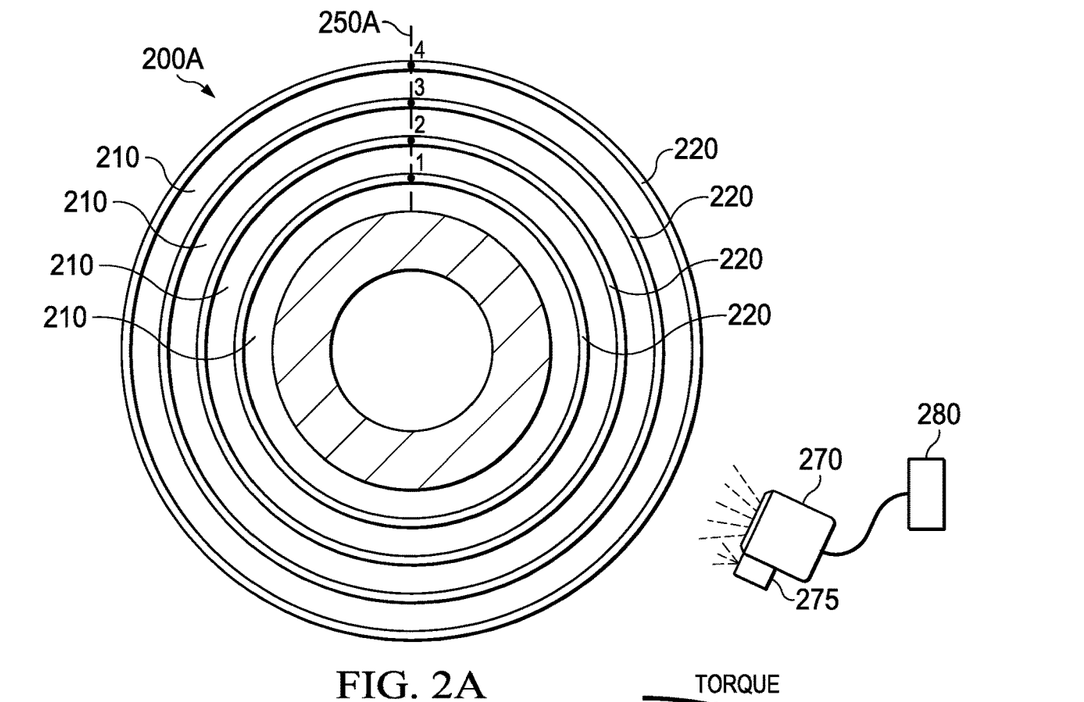
FIGS. 2A-2C are diagrams of a bearing monitoring system under the present disclosure.
Figure 2B:
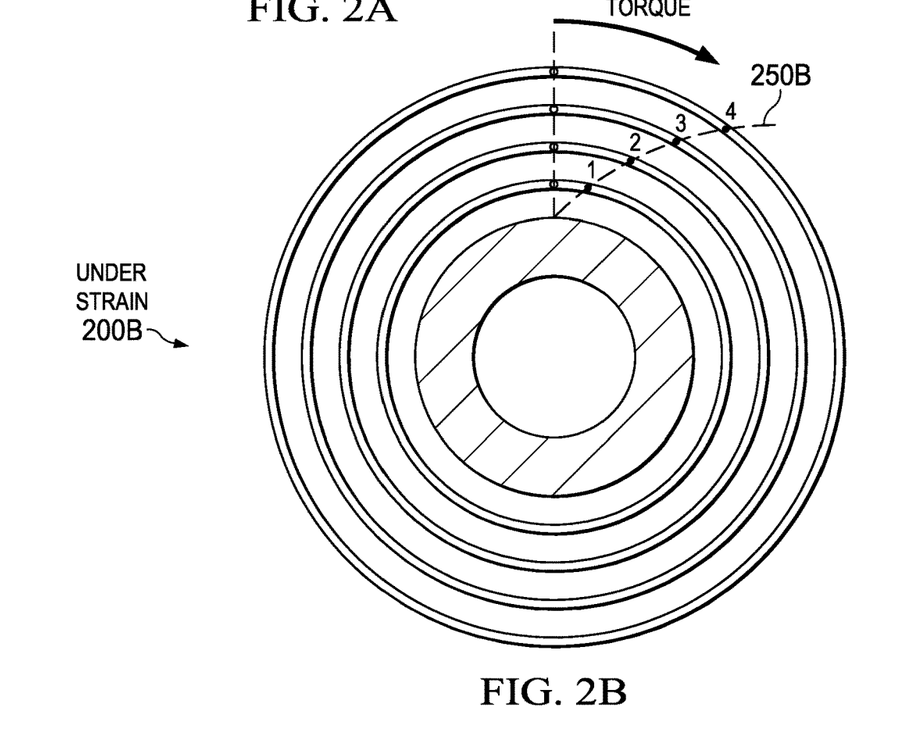
Figure 2C:
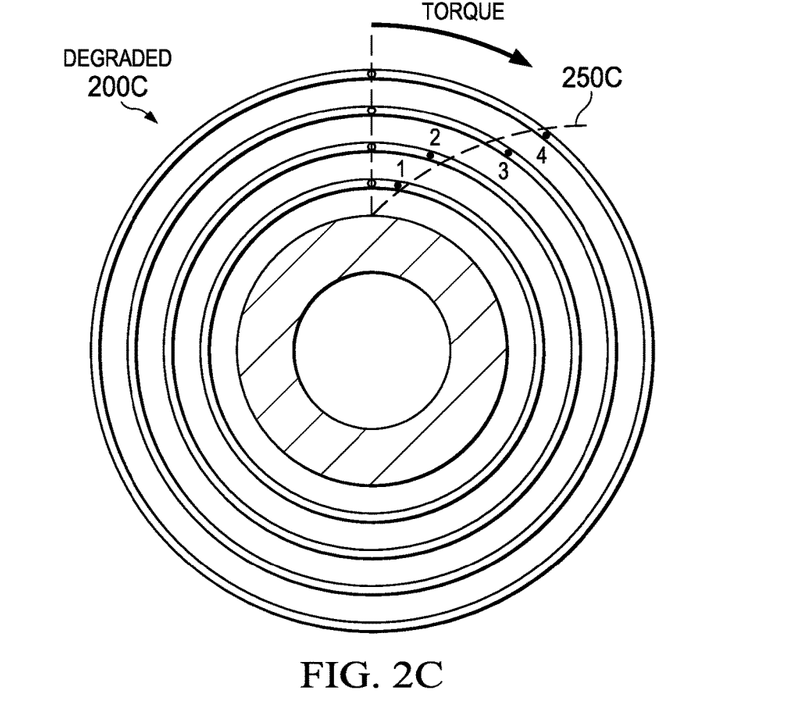

FIGS. 2A-2C show another embodiment under the present disclosure. Joint 200a in FIG. 2A comprises layers of elastomeric bearing 210 separated by layers of steel shim 220. Dots 1, 2, 3, 4 can be printed on the shims 220 and/or bearings 210. In this embodiment the dots 1, 2, 3, 4 are printed across both the bearings 210 and shims 220. In a normal state, under no torque, the dots 1, 2, 3, 4 form a straight line 250a. Camera 270 can view joint 200a and communicate the image to software in computing device 280. Computing device 280, such as a control system for a vehicle or a machine, can analyze the dot pattern. Computing device can be set to understand that pattern 250a is the normal, unstrained state. In FIG. 2B, under strain, and before wear and tear have degraded the elastomeric bearings 210, joint 200b shows that dots 1, 2, 3, 4 have moved in a predictable pattern, forming line 250b. Camera 270 can capture the image of joint 200b for analysis by computing device 280. Light source 275, optional, can provide light when needed for viewing joint 200a. Light source 275 can provide visible light, infrared, or other appropriate illumination. Computing device 280 can be set to recognize that when dots 1, 2, 3, 4 are in pattern 250b, then normal deformation of elastomeric bearings 210 is occurring and the joint is in good working condition. Computing device 280 can be preloaded with expected patterns such as 250b. Alternatively, computing device 280 can be told what materials are in use, such as the material composition of elastomeric bearing 210, and can calculate expected patterns 250b depending on factors such as age, exposure to certain environments, temperature, pressure, or other data. In FIG. 2C, joint 200c shows what a degraded elastomeric bearing 210 will cause dots 1, 2, 3, 4 to look like. Dots 1, 2, 3, 4 should be located along line 250c, but are instead spread out, showing that wear and tear has degraded the elastomeric bearings 210. Computing device 280, upon analyzing joint 200c, can detect the signs of degradation and send a notification to a user or otherwise activate some form of alarm.

Computing device 280 can take a variety of forms. It can be integrated into a camera 270. It can comprise a portion of a control system for a vehicle, machinery, or factory. It can communicate through hard wire connections or via wireless technology (Wi-Fi, Bluetooth, cellular, etc.). It can be battery powered, have an electrical cord, be powered by a vehicle engine, or other appropriate means. The computing device 280 and/or camera 270 can be powered by an energy harvesting mechanism, such as harvesting mechanical vibration, from heat generation, or from RF energy. The computing device 280 and/or camera 270 can comprise a screen or be communicatively coupled to a screen for use by a user. Warning lights, or audible alarms can be coupled to the computing device 280 or camera 270 as well.

Dots 1, 2, 3, 4 can be printed on shims 220, elastomeric bearings 210, or other portions of a joint. Dots 1, 2, 3, 4 can be applied via any appropriate printing technology including paint, 3D printing, dye, adhesives, or other means. In some embodiments a pattern may comprise a portion of the elastomer or shim.

Figure 3A:
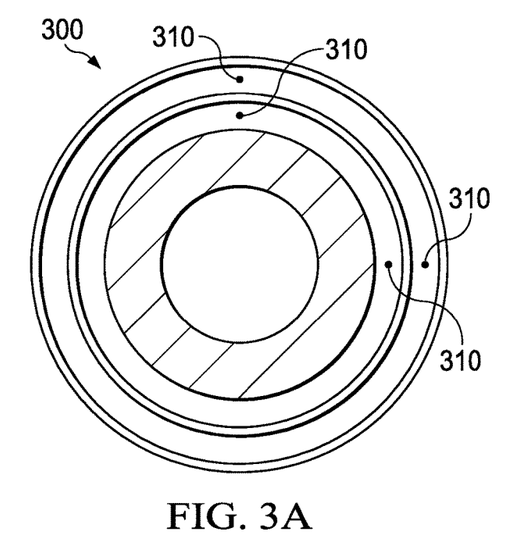
FIGS. 3A-3E show diagrams of possible pattern embodiments under the present disclosure.
Figure 3B:
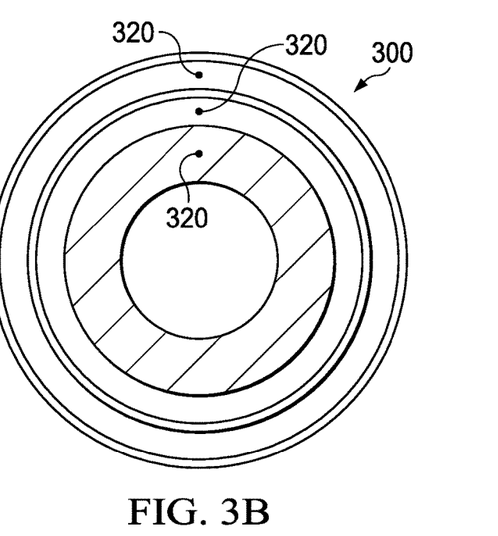
Figure 3C:
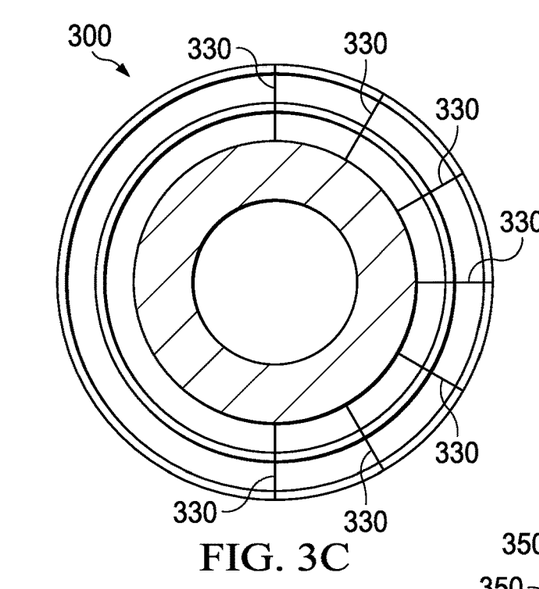
Figure 3D:
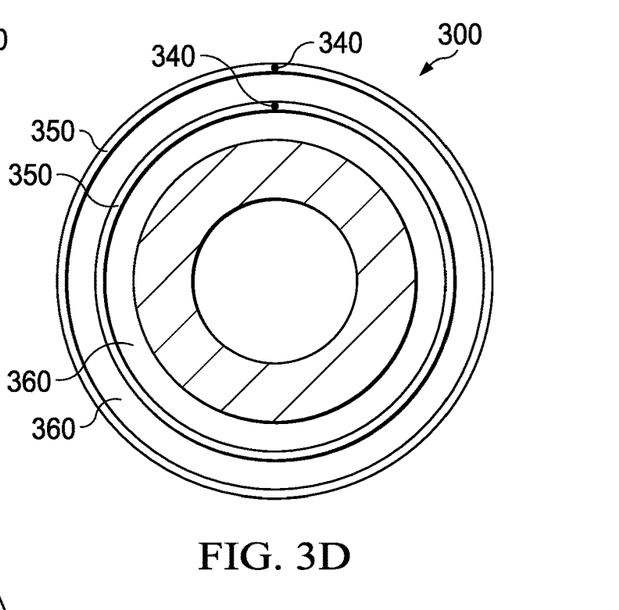
Figure 3E:
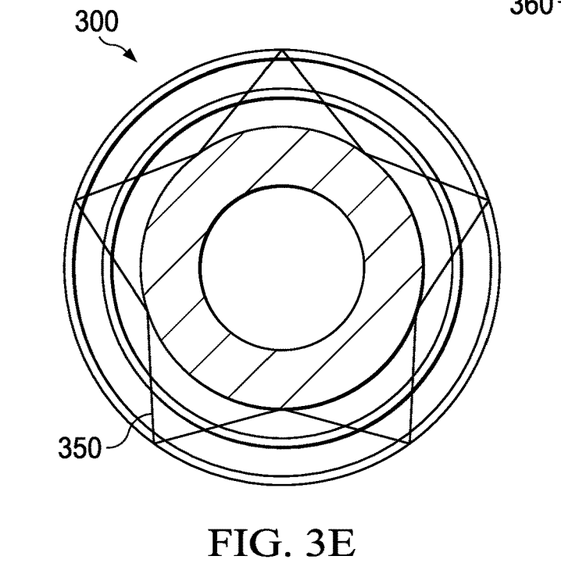

A variety of patterns are possible. The computing device 280 preferably is programmed beforehand, or can calculate, what a proper deformation pattern looks like and can determine when a deformation pattern is improper or otherwise shows signs of failure. FIGS. 3A-3E shows possible pattern embodiments 310-350 on a joint 300. FIG. 3A shows a pattern of dots located solely on elastomeric bearing material. FIG. 3B shows dots on elastomeric bearing material as well as a fixed dot on a fixed portion of joint 300. The dot on the fixed portion may not move but can provide information on how far other dots have moved. FIG. 3C shows a plurality of lines. FIG. 3D shows dots located only on shims 350 and not on elastomeric bearings 360. FIG. 3E shows a star shape printed across both the shims and elastomeric bearings. Combinations of the foregoing, and other shapes and patterns are all envisioned as part of the current disclosure. A preferred embodiment can comprise a pattern on both shims and bearings, such that shim movement and elastomeric bearing wear and tear can both be determined and analyzed. A predetermined pattern is not necessary in some embodiments. In one embodiment, a random pattern is placed or recorded/monitored on the component, and a "baseline" image is taken in a no-load condition (perhaps during every flight prior to start-up) to establish said baseline. The user could indicate when a new component is installed, or the system could infer from the large number of changes in the pattern. Then, future images (preferably under load) can be compared to the baseline to determine the degradation and stiffness. One benefit—this approach (random pattern) can be used to uniquely identify the bearing and sense changes in configuration—even if other methods of doing so (e.g., maintenance records) are incorrect.

Camera 270 and light source 275 of FIG. 2A can take a variety of forms. Camera 270 can comprise any type of digital, steady-state, infrared, or other camera, or combinations of the foregoing. Infrared cameras may be able to detect temperature changes, which can give valuable data regarding failure. In some embodiments a light source 275 may be desired or necessary. Light source 275 can comprise an LED (light emitting diode), infrared source, ultraviolet, blacklight, or other type of light such that the camera 270 in use in a given embodiment can better view the pattern (such as dots or lines) on the joint. Some embodiments may not require a light source. In many embodiments it will be desirable for the camera(s) to be quite small, including such that it can be installed with a rotor (for example). One embodiment under the present disclosure includes a joint monitoring system for elastomeric bearings within a helicopter rotor. Camera size can depend on the embodiment. Some embodiments may call for cameras sized under a centimeter or inch.

Camera 270 and computing device 280 can be programmed to keep a real-time video capture of a joint. Or they can be programmed to take a series of photos or videos and predetermined times. For example, if a joint is within an aircraft, camera 270 can take a video, or series of photos at the beginning of a flight to determine the condition of the elastomeric bearing. It may be desirable to take photos or videos during flight, or after a flight to gauge the level of degradation and for further data. In embodiments in factory machinery, real time tracking of joint behavior may be desired, or maybe photos and/or videos at certain times of the day might be preferred. A computing device can be pre-programmed with how a given elastomeric bearing and pattern should behave given the expected stresses, torques and forces. Or the computing device can be able to compute such factors given a chosen elastomeric material, joint geometry, expected forces, or other starting data that can allow for analysis of the joint and bearings.

Figure 4:
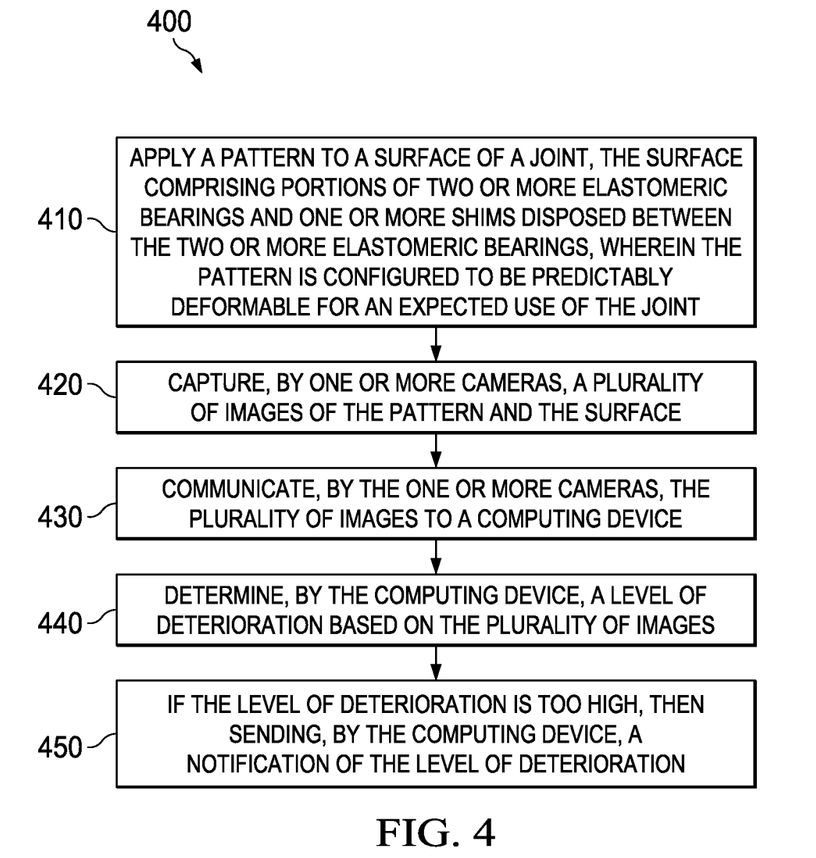
FIG. 4 shows a possible method embodiment for monitoring bearings under the present disclosure.

FIG. 4 shows a possible method embodiment 400 for monitoring elastomeric bearings under the present disclosure. Step 410 is applying a pattern to a surface of a joint, the surface comprising portions of two or more elastomeric layers and one or more shims disposed between the two or more elastomeric layers, wherein the pattern is configured to be predictably deformable for an expected use of the joint. Step 420 is capturing, by one or more cameras, a plurality of images of the pattern and the surface. Step 430 is communicating, by the one or more cameras, the plurality of images to a computing device. Step 440 is determining, by the computing device, a level of deterioration of the two or more elastomeric layers based on the plurality of images. Step 450 includes, if the level of deterioration is too high, then sending, by the computing device, a notification of the level of deterioration.

Figure 5:
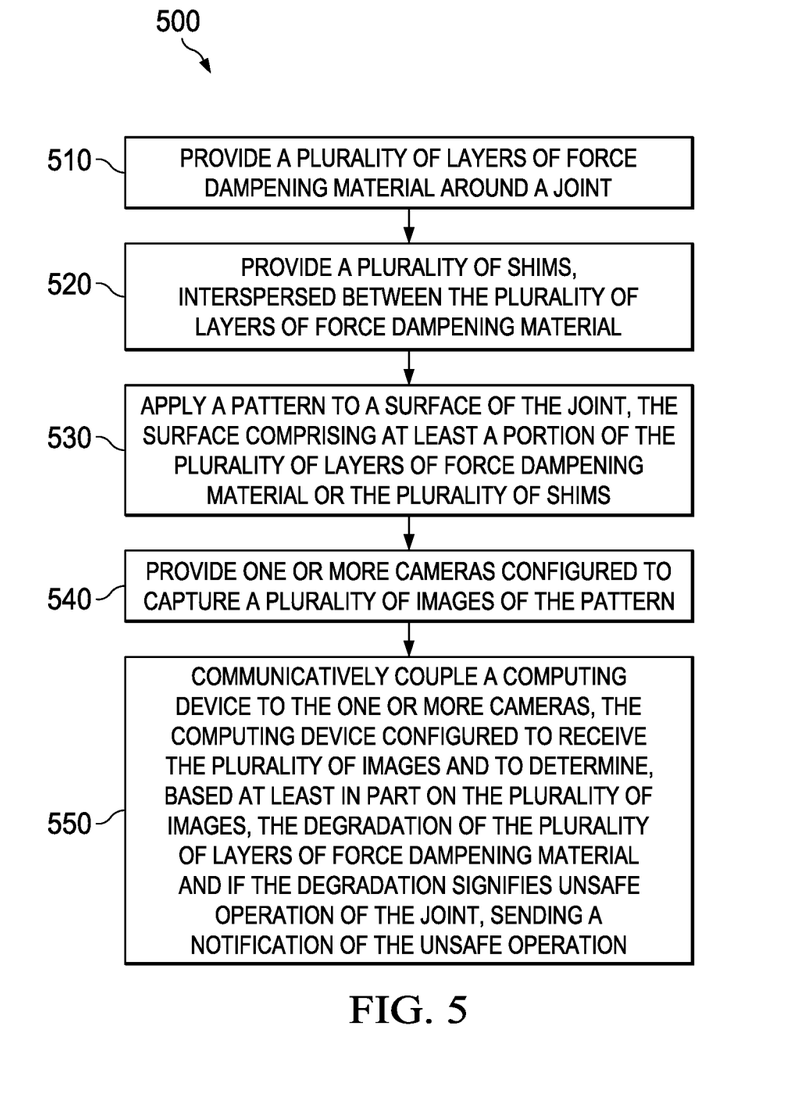
FIG. 5 shows a possible method embodiment for making a bearing monitoring system under the present disclosure.

FIG. 5 shows another possible method embodiment 500 of manufacturing a bearing monitoring system under the present disclosure. Step 510 is providing one or more layers of elastomeric force dampening or motion accommodating material around a joint. Step 520 is providing one or more shims interspersed between the one or more layers. Step 530 is applying a pattern to a surface of the joint, the surface comprising at least a portion of the one or more layers or the one or more shims. Step 540 is providing one or more cameras configured to capture a plurality of images of the pattern. Step 550 is communicatively coupling a computing device to the one or more cameras, the computing device configured to receive the plurality of images and to determine, based at least in part on the plurality of images, the degradation of the one or more layers of and if the degradation signifies unsafe operation of the joint, sending a notification of the unsafe operation. In some embodiments with only one layer of elastomeric material then step 520 will be optional and no shim may be needed.

As described above, images or video of the deformable pattern and/or joint can be done at various times. Monitoring can be real time or continuous, at steady state conditions during use of the joint, during control checks for a controlled input, upon machinery/vehicle startup, during travel or flight operations for vehicles, on a set schedule (e.g., once every five minutes), or as otherwise desired. When or how images are captured may impact how a computing device analyzes the images. For example, expected or acceptable deformation may be different at startup versus during a flight operation. In a helicopter embodiment, monitoring of the joint may be most important during the first two minutes of flight, after which monitoring can be turned off or performed at less frequent intervals.

The cameras and computing devices involved in analyzing the deformable pattern and images can use a variety of methods for analysis. Image recognition routines can be used to find cracks, crumbs, track shim motion, rubber strain via speckle interferometry, or observation of different color of sub-surface. In embodiments where infrared cameras are used the temperature data can be part of the degradation analysis. Various methods of digital image correlation or strength interferometry can be used by the cameras and computing devices. The cameras and computing devices can also be configured to provide a visual image to a user via a screen or other interface.

Various types of elastomers or force-dampening materials can be used in the bearings described. An elastomer is a polymer with viscoelasticity and with weak intermolecular forces, generally low Young's modulus and high failure strain compared with other materials. The term is sometimes considered synonymous with rubber. Examples of elastomers include natural rubbers, styrene-butadiene block copolymers, polyisoprene, polybutadiene, ethylene propylene rubber, ethylene propylene diene rubber, silicone elastomers, fluoroelastomers, polyurethane elastomers, and nitrile rubbers. Various copolymer technologies may bring new elastomers to the market in the future. Shims and other components described herein can comprise a variety of materials. Shims, for example, can comprise any appropriate metal, or plastics, composites or other materials.

In some embodiments, it may be desirable to ascertain a stiffness level of an elastomeric bearing upon starting up a machine or aircraft. For example, during a pre-flight check a known load can be applied to the bearing. The camera can view the displacement of the pattern and thereby gauge a stiffness of the bearing. This data can provide additional information used to measure unwanted deformation or wear and tear.

Embodiments shown have included multiple layers of elastomeric material. However, some bearings and joints can comprise a single layer of elastomer with no metal shim surrounding it. In single layer embodiments, or other embodiments, a pattern may need to be incorporated or printed within a single layer of elastomeric material.

The monitoring of bearings using successive images under the present disclosure can comprise and include various types of digital image correlation (DIC) and machine learning techniques. Digital image correlation and tracking can comprise optical methods that employ tracking and image registration techniques for accurate 2D and 3D measurements of changes in images. These methods can be used to measure full-field displacement and strains and other signs of wear or other phenomena. Embodiments have been described with printing a pattern onto elastomer layers and/or shims. Chemical and laser etching are also possible methods of marking a pattern. The pattern could also be molded or machined into the elastomer or shim layers. Various embodiments are possible for printing, etching, molding, machining of the pattern while still allowing for image capture to track deformation over time.

In some DIC measurement embodiments, the surface of a test specimen can be prepared with a pattern, such as described above. As long as the pattern moves and deforms with the specimens' surface during testing/monitoring, the pattern application technique should play a subordinate role. Before a test, the DIC system, such as described above, is set up for a desired field of view and calibrated. For a single camera system, the lens distortion parameters and pixel scaling can be defined. For a stereo or multi-camera DIC system, the relative camera orientations can be derived additionally. After the setup and before beginning the test or monitoring, reference images or a reference stage are captured with the camera(s) (preferably a right and left camera in multiple camera embodiments). These images can serve as a displacement and strain reference for future evaluations. During the test or monitoring stage, further image acquisition is carried out depending on the test preferences or requirements (image capture frequency, exposure time, etc.). A matrix of facets (subsets) with an application-dependent size and distance can be overlaid on the initial reference image of the camera, or one of the cameras. This matrix can consist of thousands of facets. The facets can be used to compute 2D or 3D coordinates by evaluating the gray value distribution in each facet and reidentifying it in the reference image of a second camera. For example, from the centers of the facets in the left camera images and in the right camera images, 3D coordinates can be triangulated with the help of the calibration data from the DIC sensor. The identification of corresponding facets in the left and the right camera images and through all images over time can be done in the subpixel range, thus, leading to a much higher accuracy as compared to just the pixel scaling. The initial results from DIC can comprise 3D coordinates of deformation from a specimens' surface over time. Subtracting the 3D coordinates from the recorded stages over time from the 3D coordinates of the reference image can lead to 3D displacement values. Similar processes can be used for 2D analyses. In addition, using time derivatives of the displacement values, 3D velocities and 3D accelerations can be calculated. A local plane strain tensor, considering the relative displacements between the calculated 3D coordinates, can be used for calculating surface strain measures in X-direction and Y-direction as well as the principle strains (major and minor strain) and the strain rates as time derivatives.

DIC, such as described above, can be combined with machine learning techniques to improve the functionality, over time, of the elastomeric bearing monitoring systems and methods described herein. Machine learning can include the study of computer algorithms that improve automatically through experience and by the use of data. It can be seen as a part of artificial intelligence. Machine learning algorithms can build a model based on sample data, known as "training data", in order to make predictions or decisions without being explicitly programmed to do so. Under the current disclosure, elastomeric bearing monitoring systems and methods can include the comparison of predicted failures with actual failure data. These comparisons can be used to refine the predictive ability of failure algorithms for given bearings, materials, and use cases. In this way, predictions of a given type of bearing, material, use case, etc., may change over time as additional data is collected and used to create more accurate predictive models.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for monitoring degradation of elastomeric bearings in a joint, comprising:
   a joint comprising one or more layers of elastomeric material configured to accommodate motion in the joint;
   a pattern disposed across a surface of the joint, the surface comprising the one or more layers of elastomeric material, the pattern configured to be deformed during use of the joint;
   one or more digital cameras configured to view the pattern and record one or more images of the pattern and the surface of the joint; and
   a computing device communicatively coupled to the one or more digital cameras and configured to analyze the one or more images and to determine if they indicate unacceptable degradation of the one or more layers of elastomeric material, the computing device further configured to, if unacceptable degradation is determined, provide a notification of the unacceptable degradation.

2. The system of claim 1 further comprising a light source configured to illuminate the joint for viewing by the one or more digital cameras.

3. The system of claim 1 further comprising a light source configured to illuminate the surface for better viewing by the one or more digital cameras.

4. The system of claim 1 wherein one of the one or more digital cameras is an infrared camera operable to detect temperature changes in the joint.

5. The system of claim 1 wherein the one or more elastomeric bearings comprise a unique sub-surface color and the computing device is configured to detect evidence of the sub-surface color.

6. The system of claim 1 further comprising one or more metallic shims interspersed among the one or more layers of elastomeric material.

7. The system of claim 6 wherein the pattern is disposed on the one or more layers of elastomeric material and the one or more shims.

8. The system of claim 6 wherein the pattern is disposed on the one or more shims but not the one or more layers of elastomeric material.

9. A monitoring system for elastomeric bearings, comprising:
   one or more layers of elastomeric material disposed around a joint;
   a pattern applied to the one or more layers of elastomeric material, the pattern configured to be predictably deformable when the joint is in use;
   one or more cameras operable to capture a plurality of images of the pattern; and
   a computing device communicatively coupled to the one or more cameras and operable to analyze the plurality of images and determine the level of degradation of the one or more layers of elastomeric material and to transmit a notification when the level of degradation is too high.

10. The system of claim 9 wherein the pattern comprises a dye.

11. The system of claim 9 wherein the pattern comprises an adhesive.

12. The system of claim 9 wherein the computing device, in its analysis, compares the plurality of images to pre-existing images of acceptable degradation for similar patterns.

13. The system of claim 9 wherein the computing device is programmed with data regarding the properties of the elastomeric bearings, is configured to receive data regarding forces applied to the joint, and in its analysis can calculate what the pattern should look like when deformed.

14. The system of claim 9 further comprising a light source configured to illuminate the pattern.

15. The system of claim 9 further comprising one or more shims disposed between the one or more layers of elastomeric material and wherein the pattern is also applied to the one or more shims.

16. The system of claim 9 wherein the joint comprises part of a helicopter rotor.

17. A method of monitoring one or more elastomeric bearings, comprising:
- applying a pattern to a surface of a joint, the surface comprising portions of one or more layers of elastomeric material, wherein the pattern is configured to be predictably deformable for an expected use of the joint;
- capturing, by one or more cameras, a plurality of images of the pattern and the surface;
- communicating, by the one or more cameras, the plurality of images to a computing device;
- determining, by the computing device, a level of deterioration of the one or more elastomeric bearings based on the plurality of images; and
- if the level of deterioration is too high, then sending, by the computing device, a notification of the level of deterioration.

18. The method of claim 17, wherein the analysis comprises calculating an expected shape of the pattern under deformation based at least in part on: force applied to the joint and characteristics of the two or more layers of elastomeric material.

19. The method of claim 17 further comprising capturing, by the one or more cameras, a plurality of infrared images of the pattern and the surface.

20. The method of claim 17, wherein the capturing a plurality of images comprises capturing a plurality of images at predetermined time intervals.

\* \* \* \* \*